July 30, 1968

E. A. ERICSON 3,395,378

SUPPORTING AND CONNECTING HANGER ASSEMBLY FOR
POWER UTILIZATION DEVICES FOR PLUG-IN
TYPE ELECTRICAL BUSWAYS
Filed March 22, 1967

INVENTOR
ERIC A. ERICSON

BY Arthur E. Fournier Jr.

ATTORNEY

United States Patent Office 3,395,378
Patented July 30, 1968

3,395,378
SUPPORTING AND CONNECTING HANGER ASSEMBLY FOR POWER UTILIZATION DEVICES FOR PLUG-IN TYPE ELECTRICAL BUSWAYS
Eric A. Ericson, Plainville, Conn., assignor to General Electric Company, a corporation of New York
Filed Mar. 22, 1967, Ser. No. 625,160
6 Claims. (Cl. 339—34)

ABSTRACT OF THE DISCLOSURE

A hanger assembly includes a bracket for attachment to a busway housing and means for detachably receiving one end of a tubular member which supports a power utilizing device such as a light fixture at its other end. The bracket also detachably supports a connecting plug which is connected by flexible conductors to the light fixture and which is also movable between connected and disconnected positions without detachment from the bracket. In the connected position, the plug contacts the bars of the busway to energize the fixture.

Background of the invention (1) *Field of the invention.*—My invention relates to supporting and connecting means for power utilization devices such as light fixtures used with bus bar type electrical distribution systems and more particularly to a supporting and connecting means for such fixtures which includes a hollow conduit or "pipe stem" as the weight supporting means.

(2) *Description of the prior art.*— In general, "pipe stem" hanger assemblies of the prior art have comprised an enclosure having mounting means for attachment to a busway. A connecting plug is fixedly supported in the enclosure and has plug-in type contacts for making contact with bus bars inside the busway. An elongated tubular member is attached at one end to the enclosure and the other end is adapted to be connected to and to support a lighting fixture. The plug contacts are electrically connected to the lighting fixture by means of wires which pass through the tubular member.

This type of hanger assembly has customarily been pre-assembled when used with incandescent light fixtures, that is, the wiring of plug and fixture along with the mechanical assembly of the components of the hanger assembly has been done at the place of manufacture. In the case of fluorescent light fixtures or other fixtures using a substantial length of pipe, such as example, as 18" or 24", the components may be assembled at the installation site. Such assembly and wiring must, however, be done before making the attachment of the fixture support to the busway.

The necessity of working with a hanger assembly having a lighting fixture attached thereto as a complete unit complicates the task of mechanically mounting the assembly on a busway.

A variety of simplified mounting means such as bracket members, spring clips, etc. for detachably securing the hanger assembly to the busway have been proposed and in some cases utilized in an effort to facilitate the installation of such hanger assemblies, but none of these have proven entirely satisfactory. Thus, regardless of the type of mounting means employed, the basic problem of having to work with the fixture and hanger assembly as a complete unit when making the attachment to the busway remains.

Another disadvantage of the prior art type of hanger assembly arises from the fact that when the hanger assembly is mechanically attached to a busway, the stab contacts make electrical contact with the electrical conductors in the busway at the same time. This poses a potential hazard for the man installing the hanger assembly.

A further disadvantage in the use of the prior art "pipe stem" hanger assembly structures is the need to remove the entire assembly from the busway before work can safely be done on the fixture. This is because as noted earlier there is no way of disconnecting the fixture electrically from the busway while the hanger assembly is attached to the busway.

It is an object of the present invention to provide a mounting and connecting means of the "pipe stem" type wherein (1) wiring to the connector can be done before mounting of the fixture on the busway, (2) the required connection of the fixture supporting means to the busway can be made independently of the fixture, (3) the fixture can be attached physically to the busway without simultaneously making electrical connection thereto, and (4) the electrical connection can be made as the final step of installation.

It is still a further object of the present invention to provide a mounting and connecting means of the type described wherein the fixture may be disconnected electrically from the busway while the fixture is still physically mounted on the busway.

Summary of the invention

In accordance with the invention, there is provided an electrical supporting and connecting assembly for supporting and connecting an electrical device to an electric power busway comprising a support bracket having means for attachment to the busway, and a connecting plug having a body of insulation material and a plurality of plug-in electrical contact members supported thereon. The plug is mounted on the bracket for movement relative thereto while the bracket is mounted on the busway, between a first position in which the contact members are in contact with the bus bars within the busway and a second position in which the contacts are out of engagement with the bus bars. The assembly further includes an elongated tubular support member having means for attaching a fixture at one end thereof, and means for detachably connecting the bracket to the busway.

The invention will be more fully understood from the following detailed description and its scope will be pointed out in the appended claims.

Description of the preferred embodiment

Figure 1:
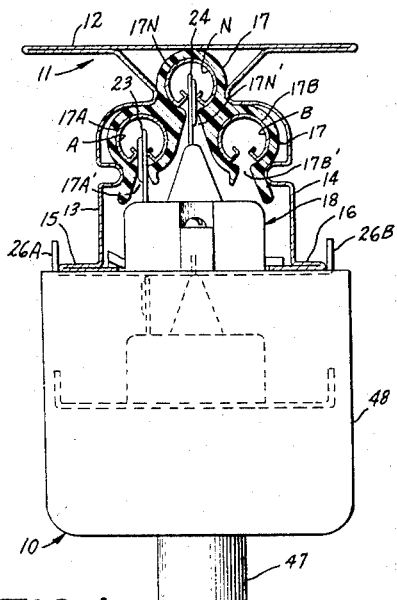
FIGURE 1 is an end view of the supporting and electrical connecting hanger assembly of the present invention, illustrated in the installed and connected condition.

Referring to FIGURE 1, the invention is shown as incorporated in a hanger assembly 10 which is illustrated as attached to a power distribution busway 11.

The busway 11 may be of any suitable type. The particular busway illustrated is described in detail in U.S. Patent 3,181,102 to J. A. Fehr, Jr., issued April 27, 1965, and assigned to the same assignee as the present invention, and will be only briefly described here. The busway 11 comprises a housing having a top wall 12, side walls 13 and 14, and base flanges 15 and 16. The flange 15 is wider than the flange 16 for a purpose to be described hereinafter. Within the housing are a plurality of bus bars A, B, and N, which are captured in corresponding longitudinally extending hollow cavities 17A, 17B, 17N of a flexible insulating body 17. The insulating body 17 comprises a suitable resilient material such as elastomeric polyvinyl chloride. Each of the cavities 17A, 17B, 17N has a longitudinally extending slot opening 17A', 17B', 17N' that faces the plane of the flanges 15, 16.

The bus bars A, B, and N comprise hollow tubular members having inturned edges spaced apart to provide longitudinally extending slots in register with the slots 17A', 17B', 17N' respectively. The slots 17A', 17B', 17N' and the bus bar slots in register therewith provide openings for admitting the stab contacts of the plug such as the plug 18 of the hanger assembly 10.

Figure 4:
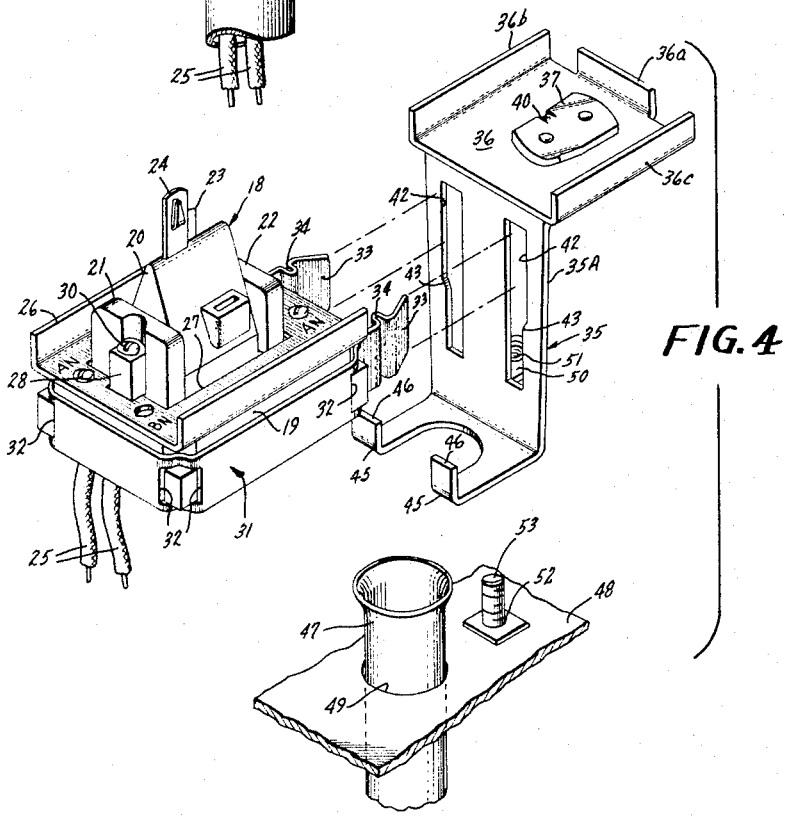
FIGURE 4 is an exploded perspective view of the hanger assembly of FIGURE 1, the outer housing or canopy being omitted.

Referring now to FIGURE 4, the hanger assembly of the invention comprises a generally Z-shaped hanger or bracket 35 carrying a connecting plug member 18. The plug 18 preferably comprises a body of insulating material having a base 19 and a cap 20 having end portions 21 and 22. Mounted in appropriate apertures in the cap 20 are stab contacts 23 and 24. The stab contacts 23 and 24 are positioned in the cap 20 so that when the plug 18 is plugged into the busway 11, the stab contact 24 enters the slot 17N' of the central cavity 17N of the insulation member 17 and engages the bus bar N, and the stab contact 23 enters one of the slots 17A', 17B' and engages one or the other of the bus bars A and B. (In FIGURE 1, the stab contact 23 is illustrated as in engagement with bus bar A.) The stab contacts 23, 24 have wires 25 connected thereto in any suitable manner within the base 19 and extending outwardly through the bottom of the base 19.

Means is provided for polarizing the plug 18 so that its stab contacts may be stabbed into only a selected one of the two circuits provided by bus bars A and N or bus bars B and N. This polarizing means comprises a generally channel-shaped polarizing plate 26, attached in any suitable manner to the base 19. The polarizing plate 26 has a generally oblong configuration and is provided with two longitudinally extending lateral flanges 26A and 26B which are bent up at right angles to the general plane of the plate. As best seen in FIGURE 1, the distance between the flanges 26A, 26B is approximately equal to the distance between the outside edges of the base flange 15, 16 of the busway housing. The central portion of the plate 26 is cut out to form an opening 27, the length of which is slightly longer than the distance between the outside faces of the end portions 21 and 22 of the cap 20. The width of the opening 27 exceeds the width of the triangular portion of the cap 20 at the plane of the base 19 by an amount sufficient to provide lateral margins to permit the plate 26 to occupy two different polarizing positions on the base 19. The cap 20 has two bosses 28 and 29 projecting from the ends thereof which overlie the top surface of the plate 26 at the end edges of opening 27 with a slight clearance. Each of the bosses 28, 29 receives a screw 30 by means of which the cap 20 is fastened to the base 19. The polarizing plate 26 can thus be slid in a transverse direction from one to the other of its polarizing positions as more clearly shown and described in my earlier U.S. Patent 3,273,103 issued September 13, 1966 and assigned to the same assignee as the present invention.

For the purpose of slidably supporting the plug 18 on the bracket 35, a U-shaped spring 31 is provided, extending along three sides of the base portion 19 of the plug 18. The spring 31 is provided with openings 32 at its corners which receive corresponding corner portions of the base 19 to thereby hold the spring in place. The free ends 33 of the spring 31 are each provided with an offset 34 extending across the width of the ends 33 for a purpose to be more fully described hereinafter.

The generally Z-shaped hanger 35 carries a plate 36 at one end thereof rigidly affixed thereto in any suitable manner such as by welding, etc. The plate 36 includes one end flange 36a and a pair of side flanges 36b and 36c. The gap between side flange 36b and end flange 36a is greater than the gap existing between side flange 36c and end flange 36a. The larger of these gaps is capable of receiving wide flange 15 of the busway 11 while the smaller gap can only accommodate flange 16 of the busway 11. Thus, plate 36 functions as a form of polarizing means inasmuch as because of it, the hanger 35 can only be attached to the busway in one preselected way.

For the purpose of fastening the hanger assembly 10 to the busway housing, an elongated latch plate 37 is provided, rotatably mounted on the inner surface of the plate 36. In the position illustrated in FIGURE 4, the plate 37 will pass through the continuous opening or slot between the busway flanges 15, 16, but when turned 90° from this position, the latch plate will overlap or bridge the flanges. For the purpose of retaining the latch plate 37 in place, a washer 39 is provided positioned on the opposite surface of the end portion of the hanger 35 on which the plate 36 is mounted. A pair of screws 41 join the washer 39 to the plate 37, passing through a clearance opening (not shown) of the hanger 35. The clearance opening referred to comprises an elongated, generally arcuate opening in the plate 36 and a similar registering arcuate opening in the hanger 35. The clearance opening is dimensioned to provide diametrically opposed abutments which cooperate with a bent-up tab 40 of the latch plate 37 to limit the rotation of the latch plate 37 and the washer 39 by engagement with the screws 41.

Figure 2:
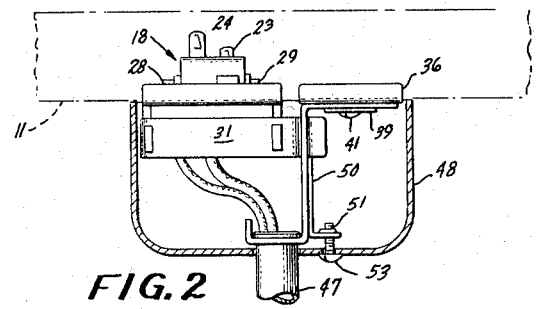
FIGURE 2 is a side view of the hanger assembly of FIGURE 1, a portion of the outer housing or "canopy" being broken away to show the internal construction.
Figure 3:
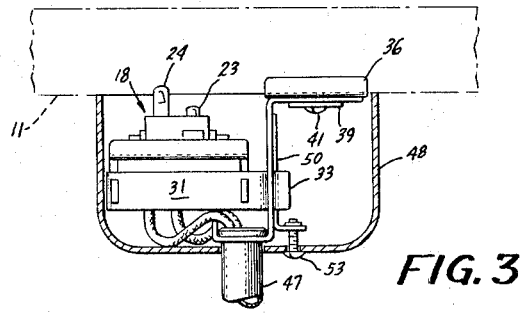
FIGURE 3 is a side view similar to FIGURE 2 but with the contacts of the assembly shown in the disconnected condition.

The intermediate portion 35A of the Z-shaped bracket 35 (see FIGURE 4) is provided with a pair of vertically extending slots 42 which are enlarged at their upper portions forming an intermediate shoulder 43 in each slot. In order to mount the plug 18 on the bracket 35, the ends 33 of spring 31 are inserted into the slots 42 so that the outer edges of the slots 42 are positioned in the grooves 34 of the spring ends 33. With the edges of the slots 42 riding in the grooves 34, the plug is slidable from the OFF position shown in FIGURE 3 wherein the plug 18 is withdrawn from the busway 11 to the ON position illustrated in FIGURE 2 wherein the stab contacts 23, 24 of the plug 18 are in engagement with the respective bus bars of the busway 11. The shoulders 43 provided in the slots 42 retain the plug 18 in the ON position.

The end of the hanger 35 remote from the latch plate 36 is bifurcated to provide a pair of extending arms 45. The arms 45 have their ends 46 upturned to provide tabs which serve to retain the flared end of a pipe section or stem 47 in the slot provided between the arms 45, while permitting easy removal by raising the pipe stem 47 to clear the ends 46.

The lower end of the pipe stem 47 is threaded for attachment to a lighting fixture (not shown) or other comparable device. The wires 25 which are electrically connected to one end to the stab contacts 23, 24 pass through the pipe stem 47 to the lighting fixture supported at the lower end thereof, and thereby provide a means of electrically energizing the fixture from the busway 11.

For the purpose of protecting the plug 18 and bracket 35, a generally rectangularly shaped canopy or cover 48 is provided having an opening 49 in the bottom surface thereof for receiving the pipe stem 47. The diameter of the opening 49 is preferably made of a lesser dimension than the flared end of the pipe stem 47 whereby the flared end of the pipe stem 47 will be retained within the canopy 48 should an accidental disengagement of the pipe stem from the slotted end of the bracket 35 occur.

Suitably secured to the back of the intermediate portion of the hanger 35 as by welding, etc. is a generally L-shaped bracket 50 having a threaded hole 51 aligned with an unthreaded hole 52 in the canopy 48 adjacent the opening 49 and receiving a screw 53 to secure the canopy 48 to the hanger 35.

In the preferred method of assembly of the hanger assembly 10, the threaded end of the pipe stem 47 is inserted through the opening 49 in the canopy 48 and then fastened to the fixture. These steps along with the wiring of the plug 18 can be accomplished while the fixture is on a workbench, etc. The hanger 35 is separately attached in the desired position to the busway 11 by means of latching plate 37 in the manner previously set forth. The assembly comprising the fixture and plug 18 can then be raised into position, and the flared end of the pipe stem 47 placed in the slot between the arms 45 of the hanger 35. The ends 33 of the spring 31 encircling the plug 18 can then be readily inserted in the slots 42 provided in the hanger 35, after which the plug 18 can be pushed up into the ON position into contact with the bus bars, where it is retained by virtue of the shoulders 43 as previously set forth. The canopy 48 is then raised into position around the plug 18 and the hanger 35, and secured in place by means of screw 53.

While the invention has been shown in only one particular embodiment, it will be apparent that many modifications thereof may be made, and it is therefore intended by the appended claims to cover all such modifications as fall within the true spirit and scope of the invention.

What I claim as new and desire to secure by Letters Patent of the United States is:

1. An electrical supporting and connecting assembly for supporting and connecting an electrical device to an electric power busway comprising:
   (a) a support bracket having means for attaching said bracket to said busway;
   (b) a connecting plug having a body of insulating material, said body of insulating material having a plurality of plug-in type electrical contact members supported thereon and a plurality of electric terminals each connected to one of said contact members;
   (c) mounting means mounting said connecting plug on said support bracket, said mounting means providing for movement of said connecting plug on said support bracket while said bracket is mounted on said busway between a first position in which said contact members are in contact with bus bars within said busway and a second position in which said contact members are out of contact with said bus bars, said mounting means also providing for ready detachment of said connecting plug from said bracket when in said second position;
   (d) an elongated tubular support member; and
   (e) means detachably connecting one end of said tubular support member to said bracket, whereby said bracket may be mounted on said busway before said connecting plug is attached to said bracket and said connecting plug may be connected to said electrical device by conductors extending from said terminals through said tubular support member to said electrical device and said tubular member and said plug may thereafter be attached to said bracket with said connecting plug in said second position, and said connecting plug may thereafter be moved from said second position to said first position to energize said electrical device.

2. An electrical supporting and connecting assembly as set forth in claim 1,
   (a) said support bracket comprising an elongated metallic member having first and second end portions and an intermediate portion;
   (b) said means for attaching said bracket to said busway being carried by said first end portion;
   (c) said means detachably connecting said tubular member to said bracket being carried by said second end portion; and
   (d) said mounting means mounting said connecting plug on said bracket being carried by said intermediate portion.

3. An electrical supporting and connecting assembly as set forth in claim 1,
   (a) said support bracket comprising an elongated metallic member having a plurality of slots therein; and
   (b) said mounting means mounting said connecting plug on said support bracket including resilient means supporting said connecting plug in said slots.

4. An electrical supporting and connecting assembly as set forth in claim 1,
   (a) said support bracket comprising an elongated metallic member having first and second end portions and an intermediate portion having a plurality of slots therein;
   (b) said means for attaching said bracket to said busway being carried by said first end portion;
   (c) said means detachably connecting said tubular member to said bracket being carried by said second end portion; and
   (d) said mounting means mounting said connecting plug on said support bracket including resilient means supporting said connecting plug in said slots.

5. An electrical supporting and connecting assembly for supporting and connecting an electrical device to an electric power busway comprising:
   (a) an elongated generally Z-shaped hanger comprising a first generally planar portion adjacent one end, a second generally planar portion adjacent the other end, and a generally planar intermediate portion interconnecting said first and second portions;
   (b) said first portion of said hanger including means for attaching said hanger to said busway;
   (c) said second portion of said hanger including supporting means for supporting said electrical device;
   (d) a connecting plug having a body of insulating material and a plurality of plug-in type electrical contacts supported thereon;
   (e) resilient support means for mounting said plug on said intermediate portion of said hanger for movement between a first position in which said contacts are in contact with bus bars within said busway and a second position in which said contacts are out of contact with said bus bars; and
   (f) a generally rectangular box-like cover partially enclosing said bracket and said plug, and means detachably securing said cover to said hanger.

6. An electrical supporting and connecting assembly for supporting and connecting a fixture to a busway having a plurality of bus bars enclosed therein comprising:
   (a) a generally Z-shaped hanger member including an elongated intermediate portion having a pair of spaced elongated slots extending longitudinally therein and end portions extending outwardly transversely therefrom, one of said end portions comprising a pair of extending arms forming a slotted opening therebetween;
   (b) means carried by the other of said end portions of said Z-shaped hanger member for attaching said Z-shaped hanger member to said busway;
   (c) a connecting plug having a plurality of stab contacts extending outwardly therefrom, said connecting plug also including resilient support means mounting said plug in said elongated slots of said Z-shaped hanger member;

(d) a fixture support member having mounting means at one end thereof, said support member being detachably mounted in said slotted opening in said one end of said Z-shaped hanger member; and (e) a cover partially enclosing said Z-shaped hanger member and said plug, said cover being detachably secured to said Z-shaped hanger member.

References Cited

UNITED STATES PATENTS

| | | | |
|---|---|---|---|
| 2,724,093 | 11/1955 | Preston | 339—75 |
| 3,239,795 | 3/1966 | Verrone | 339—91 |
| 3,345,604 | 10/1967 | Henschen et al. | 339—186 |

RICHARD E. MOORE, *Primary Examiner.*

J. H. McGLYNN, *Assistant Examiner.*